US012664866B2

(12) United States Patent
Lenz

(10) Patent No.: US 12,664,866 B2
(45) Date of Patent: Jun. 23, 2026

(54) FIRE SAFETY LIGHT

(71) Applicant: Roen William Lenz, Adel, IA (US)

(72) Inventor: Roen William Lenz, Adel, IA (US)

( * ) Notice: Subject to any disclaimer, the term of this patent is extended or adjusted under 35 U.S.C. 154(b) by 0 days.

(21) Appl. No.: 18/669,778

(22) Filed: May 21, 2024

(65) Prior Publication Data

US 2025/0363878 A1 Nov. 27, 2025

(51) Int. Cl.

*G08B 17/10* (2006.01)
*F21S 8/00* (2006.01)
*G08B 25/08* (2006.01)

(52) U.S. Cl.

CPC .............. *G08B 17/10* (2013.01); *F21S 8/033* (2013.01); *G08B 25/08* (2013.01)

(58) Field of Classification Search

None
See application file for complete search history.

(56) References Cited

U.S. PATENT DOCUMENTS

| | | | | |
|---|---|---|---|---|
| 5,594,422 A * | 1/1997 | Huey, Jr. | G08B 29/145 340/693.11 |
| 6,222,455 B1 * | 4/2001 | Kaiser | G08B 17/113 340/584 |
| 6,313,549 B1 * | 11/2001 | Moisan | G08B 7/066 307/66 |
| 8,376,567 B1 * | 2/2013 | Zozula | G08B 7/066 362/217.1 |
| 9,746,632 B1 * | 8/2017 | Tilaye | H04B 10/116 |
| 10,810,913 B2 * | 10/2020 | Gonchar | G08B 5/00 |
| 12,347,305 B2 * | 7/2025 | Gregorio | G01C 21/206 |
| 2002/0057204 A1 * | 5/2002 | Bligh | G08B 7/062 340/691.1 |
| 2003/0218545 A1 * | 11/2003 | Colberg | G08B 7/062 340/815.4 |
| 2015/0194127 A1 * | 7/2015 | Fiedler | G05B 15/02 345/690 |
| 2016/0003428 A1 * | 1/2016 | Anderson | F21S 4/26 362/147 |
| 2016/0284177 A1 * | 9/2016 | Lo | H05B 45/10 |
| 2024/0078879 A1 * | 3/2024 | Li | H04M 11/025 |
| 2024/0369982 A1 * | 11/2024 | Bankay | G08B 21/02 |

FOREIGN PATENT DOCUMENTS

| | | | | |
|---|---|---|---|---|
| GB | 2516073 A * | 1/2015 | G08B 7/062 |
| WO | WO-2005116519 A1 * | 12/2005 | G08B 7/066 |

* cited by examiner

*Primary Examiner* — Muhammad Adnan
(74) *Attorney, Agent, or Firm* — Clark Hill PLC; John S. Paniaguas

(57) ABSTRACT

A system is disclosed comprising a smoke detector, a transmitter, several fire safety lights, and control circuitry, mounted on or near the bottom rail of interior and exterior doors along exit paths within the living space. The fire safety lights on all doors along an exit path are wired together and illuminate during a fire in response to a trigger signal from the control circuit to provide a viable exit path for the occupants. The fire safety lights along the exit paths of the living space provide for faster evacuation of the living space, thus potentially reducing injury and possible deaths from the fire.

2 Claims, 11 Drawing Sheets

FIRE SAFETY LIGHT

BACKGROUND OF THE INVENTION

1. Field of the Invention

The present invention relates to a fire safety light system that includes a smoke detector and several fire safety lights mounted on or near a bottom rail on an interior door that illuminate during a fire in response to a trigger signal from the smoke detector to illuminate door passageways in exit paths in residential living spaces to occupants in a building.

2. Description of the Prior Art

Smoke detectors are known for detecting smoke caused by a fire. Smoke detectors are known to generate an alarm when smoke from a fire is detected. Since smoke is known to rise, such smoke detectors are normally installed on the ceiling of residential living spaces.

Municipalities require smoke detectors to be installed in all new residential living spaces. In addition, for additional safety, at least two exit routes are required for bedrooms. Despite these safety requirements, hundreds of thousands residential fires are reported each year resulting in over 2000 deaths, as reported by Worth Insurance company. These fires are known to be caused by cooking equipment, heating equipment, electrical equipment and smoking to name a few.

When a fire breaks out in a residential living space, dense black smoke blankets the area, hampering the occupants from finding an exit. Fire detectors detect the fire and sound an alarm but provide no guidance on the location of exits.

SUMMARY OF THE INVENTION

Briefly, the present invention relates to a system comprising a smoke detector, a transmitter, control circuitry and several fire safety lights, for example, LED lights, mounted on or near the bottom rail of interior and exterior doors along exit paths within the living space. The fire safety lights on the doors along an exit path may be wired together to illuminate together during a fire in response to an INTERCONNECT signal from the smoke detector to provide a viable exit path for the occupants. The fire safety lights along the exit paths of the living space provide for faster evacuation of the living space, thus potentially reducing injury and possible deaths from the fire.

DESCRIPTION OF THE DRAWING

These and other advantages of the present invention will be readily understood with reference to the following specification and attached drawing, wherein.

DETAILED DESCRIPTION

Figure 2A:
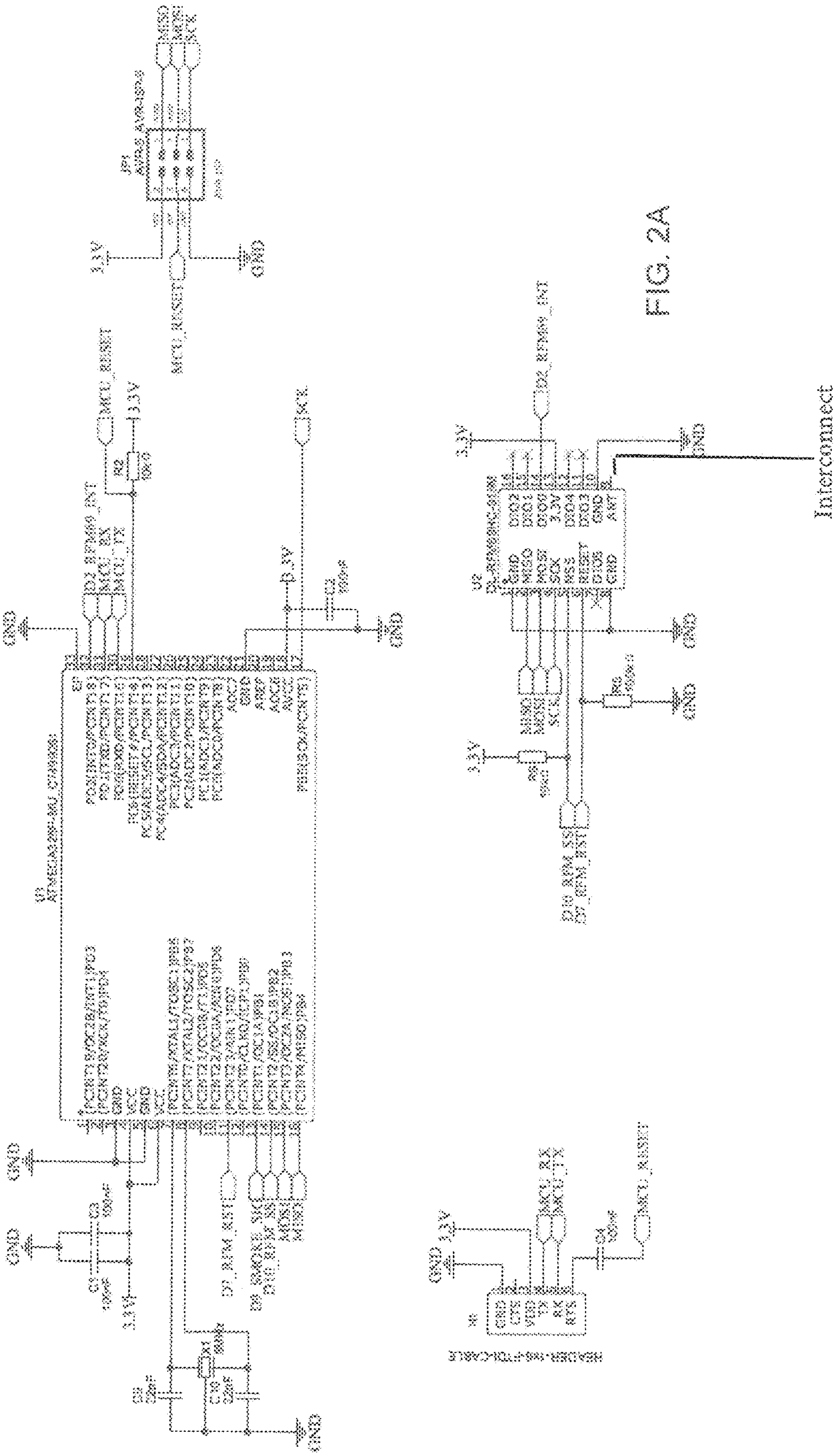
FIGS. 2A and 2*b* are exemplary electrical schematic diagrams of a transmitter circuit, mounted adjacent the smoke detector, as illustrated in FIG. 1, in accordance with the present invention
Figure 2B:
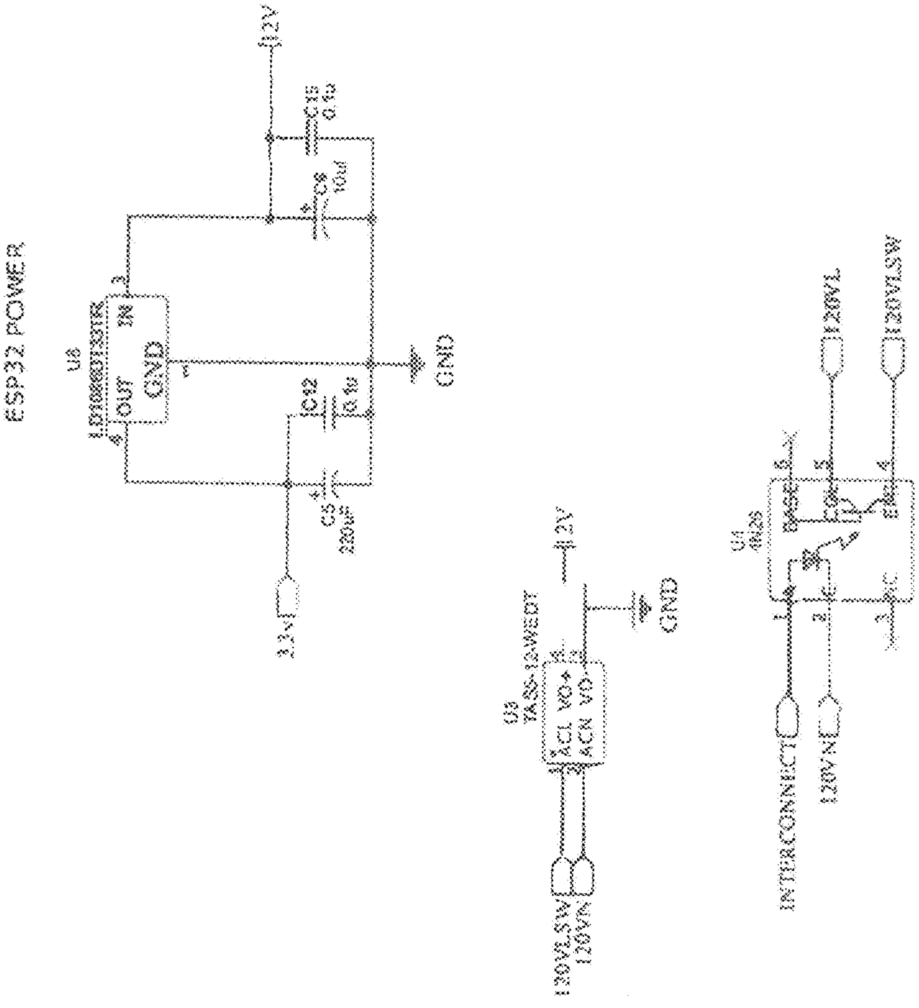
Figure 2C:
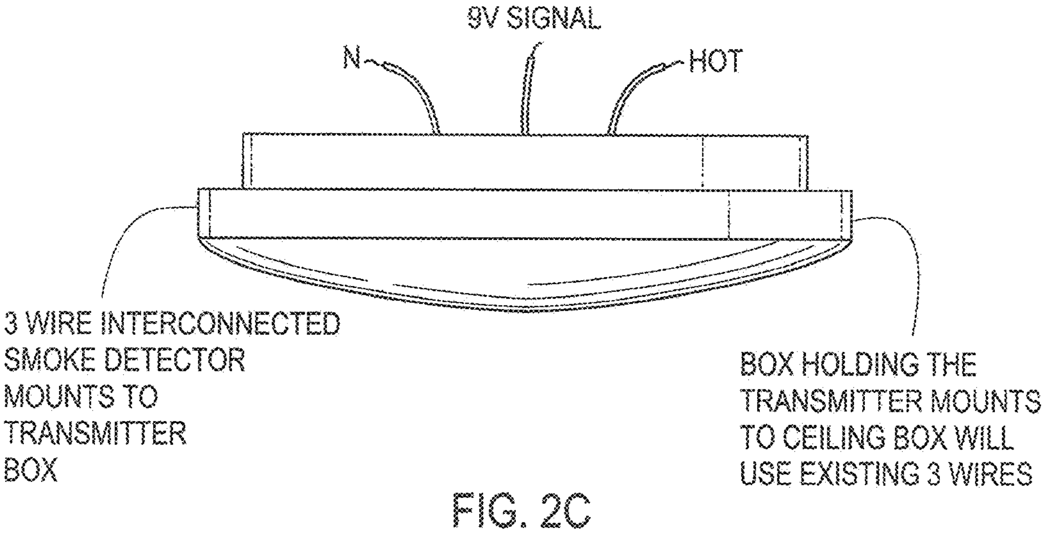
FIG. 2C is an exemplary housing for carrying the smoke detector and transmitter illustrated in FIG. 1.
Figure 3A:
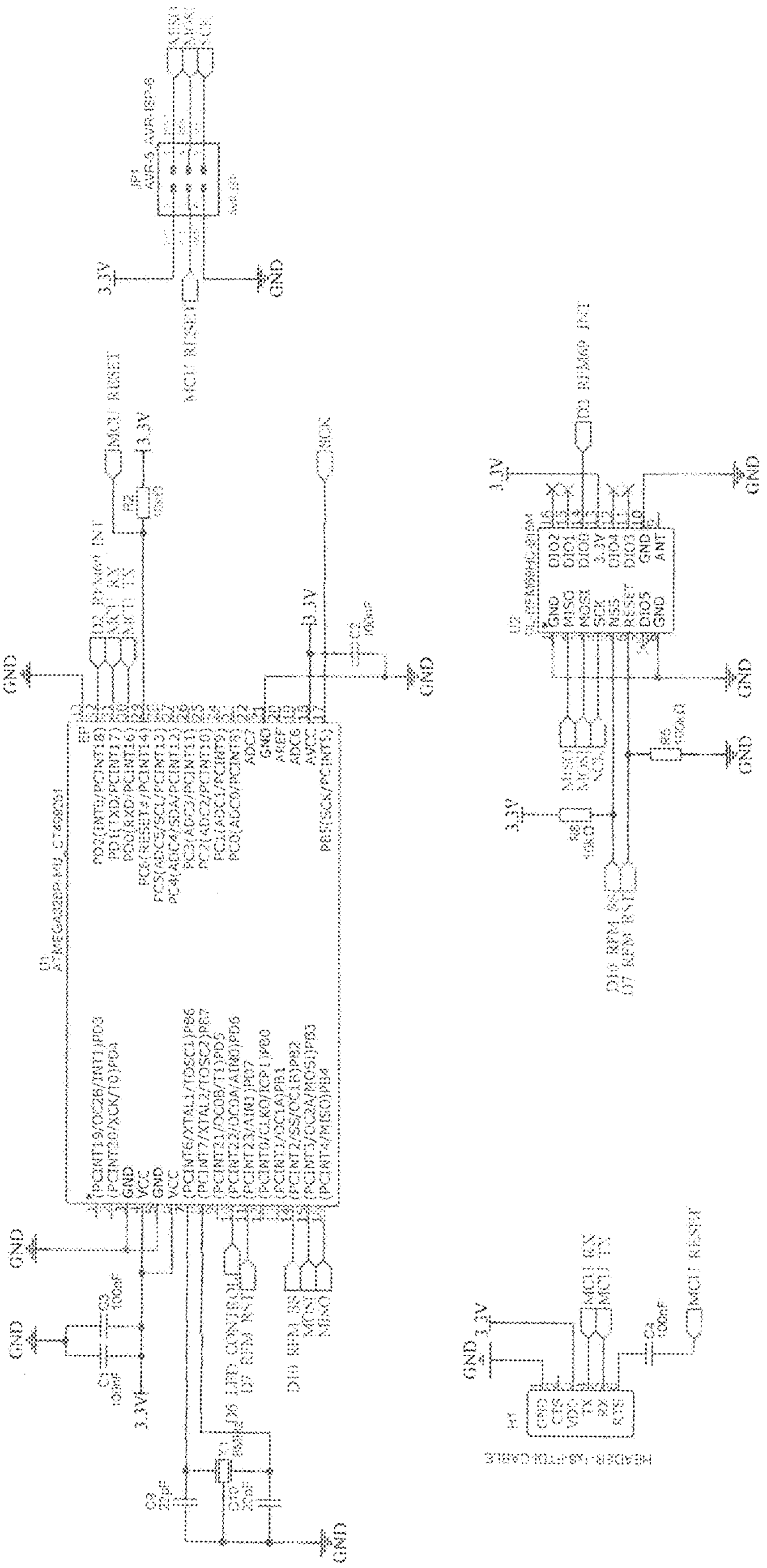
FIGS. 3A, 3B and 3C are exemplary schematics of the control circuitry and LED lights, mounted adjacent the bottom of a door along the exit path within a living space for the fire safety light system in accordance with the present invention.
Figure 3B:
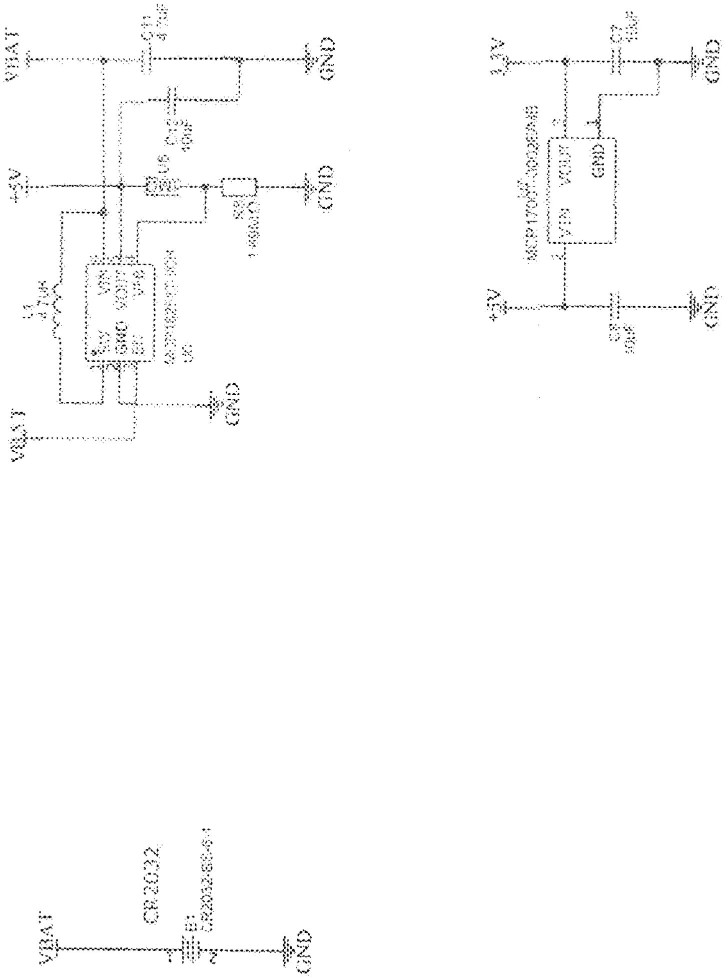
Figure 3C:
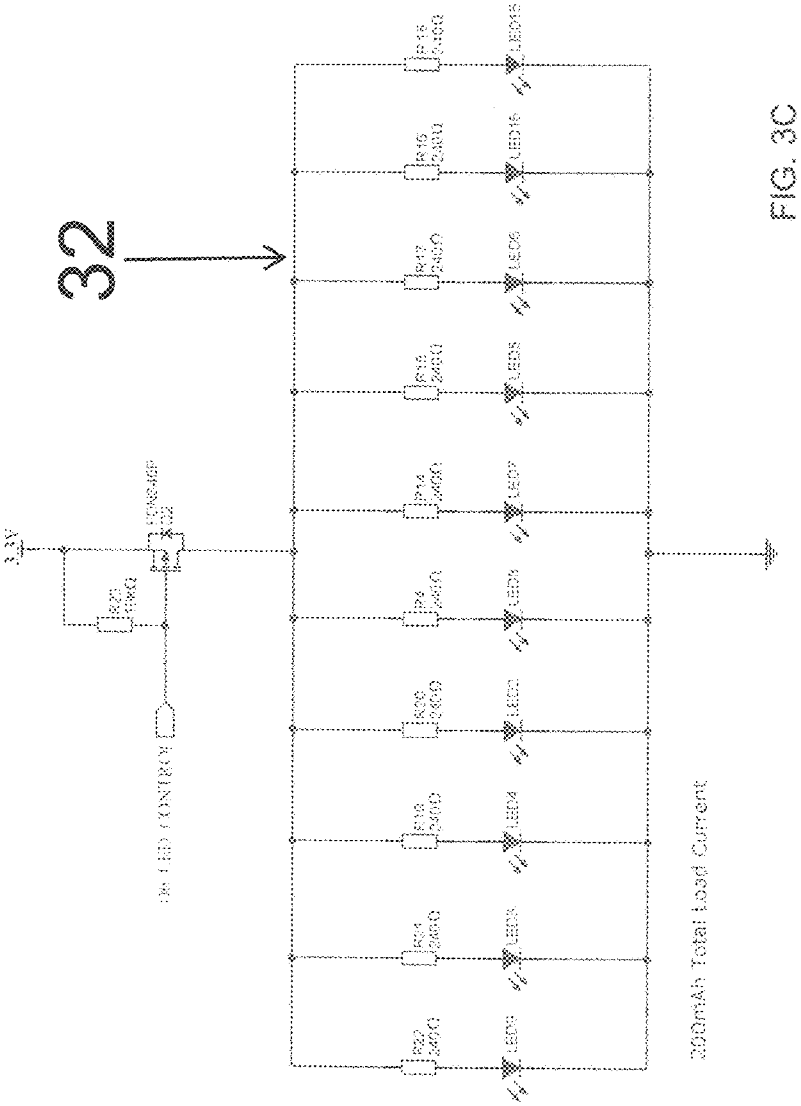

The present invention relates to a fire safety light system that can reduce injury and death in conventional living spaces due to a fire. Fire light safety system 20 comprises one or more fire safety lights, for example, LED lights, and control circuitry, housed in an enclosure and mounted on or near bottom rails on one or more interior doors along an exit path in a living space. The system also includes a remote smoke detector system 20 and a transmitter circuit 23 (FIGS. 2A and 2B) mounted in a housing (FIG. 2C) adjacent to the smoke detector 20, for transmitting a wireless signal to trigger the fire safety lights. The system also includes a control circuit (FIGS. 3A and 3B) and several fire safety lights, for example 10, connected in parallel as shown in FIG. 3C.

Smoke Detector

Figure 1:
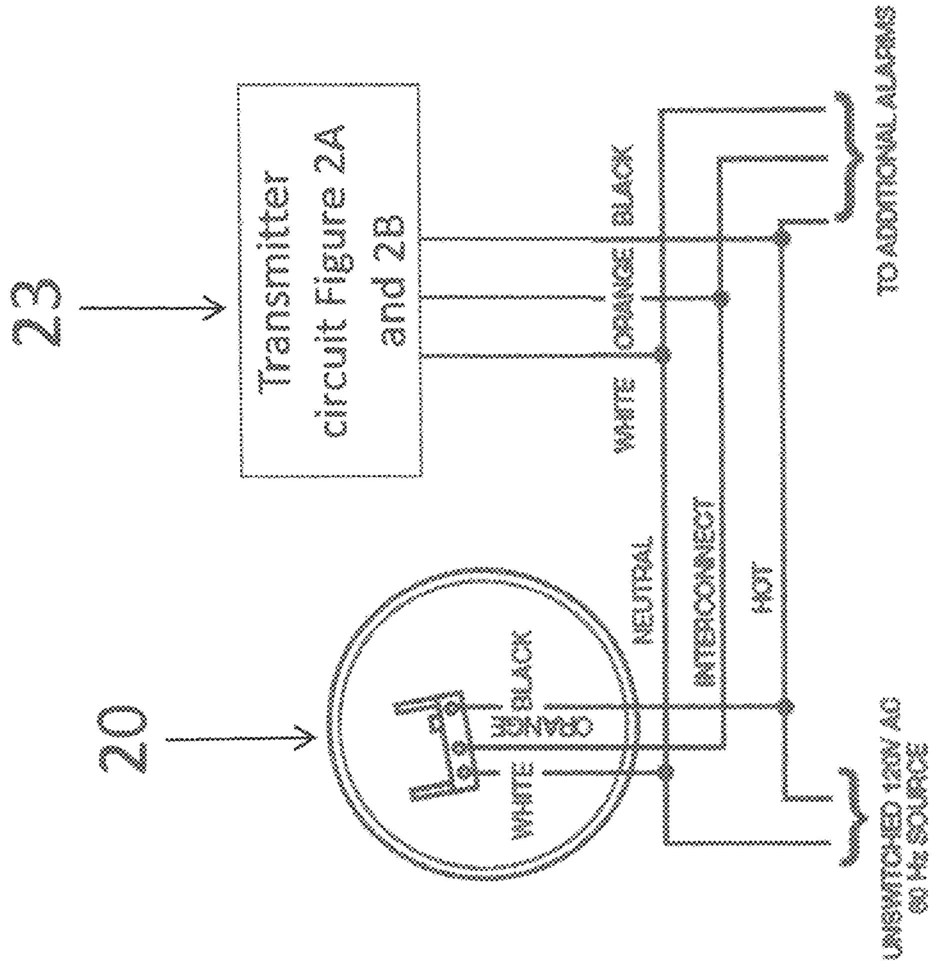
FIG. 1 is a electrical diagram of an exemplary smoke detector and transmitter circuit mounted adjacent the smoke detector.

Referring to FIG. 1, a commonly known 3-terminal smoke detector with white, black and orange conductors is shown. The black and white conductors are shown connected to an unswitched 120-volt AC source. The orange conductor, identified as an INTERCONNECT, is used to indicate a fire.

Transmitter Circuit

The fire safety light system includes a transmitter circuit 23, mounted adjacent the smoke detector 20. As shown in FIG. 2B, the INTERCONNECT signal from smoke detector 22 is applied by way of an optocoupler U4, for example, a Vishay, model 4N26. The optocoupler U4 includes a photodiode and a phototransistor. As discussed below, a 120VLSW signal at the output of the optocoupler U4 is transmitted to the control circuitry adjacent the fire safety lights.

The optocoupler U4 requires 120-volt AC source. This voltage is developed by a DC low voltage regulator U8, for example, a model LD1086DT33TR, to boost a 3.3-volt DC signal to 12 volts DC. This 12-volt DC output is applied to an AC-DC power module U3, for example, a TAS5-12-WEDT, available from AliExpress is used to generate 120-volt AC signals, 120VLSW, 120VL and 120VN. These signals are applied to the optocoupler U4. The 120VN signal is applied to the cathode of a photodiode and the 120VLSW signal is applied to the emitter terminal of the phototransistor in the optocoupler U4. A signal 120VL is applied to a collector terminal of the phototransistor.

The INTERCONNECT signal from the smoke detector 20 is applied to the cathode terminal of the photodiode. When the INTERCONNECT signal is high, the photodiode conducts causing the phototransistor to switch. This causes the 120VLSW signal to go high indicating a fire. This signal is transmitted to the control circuitry (FIG. 3A) by an antenna, available at pin 9 of a transceiver U2, a model RFM69HCW wireless transceiver, available from LCSC Electronics. Transceiver U2 is forms part of the transmitter 23 circuit (FIG. 1). The balance of the circuitry illustrated in FIG. 2A is the same as the circuitry illustrated in FIG. 3A and described below.

Control Circuit

The fire signal from transmitter 23 is received by pin 9 of another transceiver U2, which forms part of the control circuitry, located adjacent the LEDs. Transceiver U2 may be a model RFM69HCW wireless transceiver, available from LCSC Electronics. Transceiver U2 cooperates with a microcontroller U1, for example, an ATMEGA 328P-C749261 microcontroller. Each bit of the fire signal is transferred from the transceiver U2 to the microcontroller U1 by way of MISO/MOSI pins on the devices U1 and U2 during every clock pulse generated by SCK on pin 17. The clock pulses are generated by a clock circuit that includes the capacitors C9 and C10 and the crystal X1.

Upon detection of a fire signal, microcontroller U1 generates a trigger signal on pin 14 to illuminate the fire safety lights 30 (FIG. 3). When the signal from the trigger signal is no longer present, the transceiver U2 is interrupted by way by way of a connection between pin 11 on the microcontroller U1 and pin 6 on the transceiver U2.

The microcontroller U1 and transceiver U2 form a master/slave relationship. In order for the transceiver U2 to connect with the microcontroller U1, the transceiver U2 must be selected. As such pin 14 on the microcontroller U1 is connected to pin 5 of the transceiver U2. Pin 6 on transceiver U2 is used is used to reset the radio portion on the transceiver U2. Pin 6 is pulled down by a resistor R5 to keep the radio portion on. Normally, the transceiver U2 is reset on power on. Pin 6 also allows for manual reset of the radio by pulling pin 6 high for a short period of time by way of pin 11 on the microcontroller U1 and then releasing it.

Both the microcontroller U1 and the transceiver U2 are powered from 3.3 volts DC and are connected to ground. VCC Pins 4 and 6 of the microcontroller U1 are connected to the 3.3 volts DC by way of a pair of parallel capacitors C1 and C3, while pin 18 is connected to the 3.3 volts DC by way of a capacitor C2. The capacitors C1-C5 stabilize the voltage to the microcontroller U1.

Figure 4:
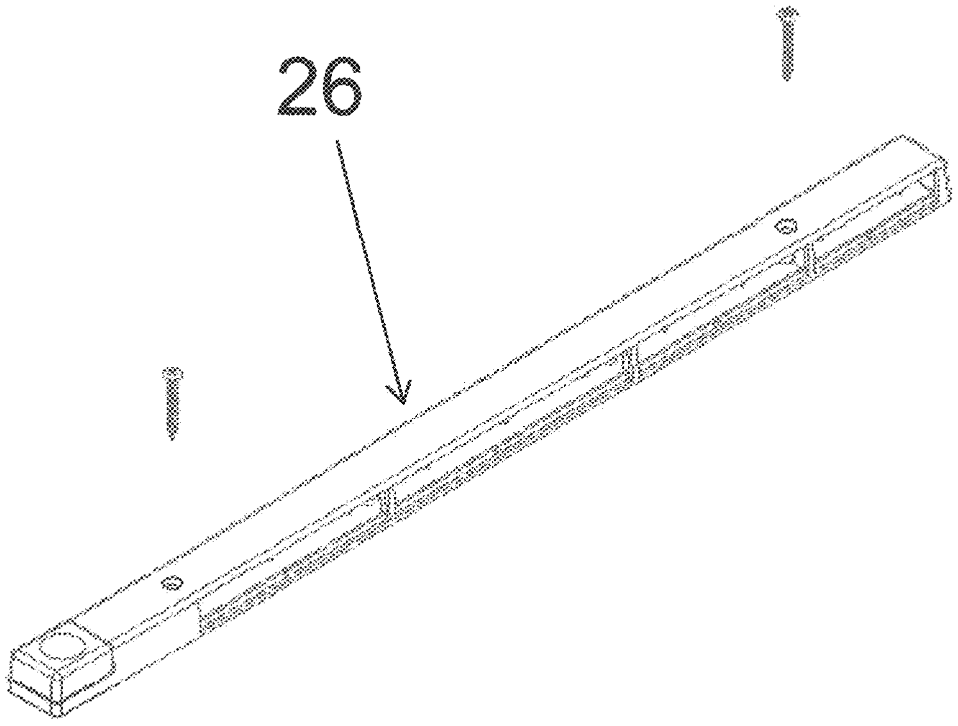
FIGS. 4 and 5 illustrate an exemplary embodiment of a mounting structure open on one end for mounting an LED circuit on the bottom rail of an interior door.

The control circuitry is powered by a 3.3-volt Model CR2032 Energizer battery B1 (FIG. 4). The battery B1 may be regulated. In order to regulate the battery B1. The battery B1 is stepped up to 5 volts DC by a DC-to-DC converter U6, for example, a Model MCP16252T-ICH, manufactured by Microchip Technologies. The 5-volt output from the converter U6 is applied to a voltage regulator U7 to provide a regulated 3.3-volt DC supply that is applied to the microcontroller U1 and transceiver U2

Various pins on the microcontroller U1 and transceiver U2 are grounded. Specifically, pins 3, 5, 21 and 33 on the microcontroller U1 are connected to the ground while pins 1, 8 and 10 on the transceiver U2 are grounded.

In-Circuit Programmer

The circuit may optionally contain an in-circuit programmer JP1, such as an AVR-ISP-6, for example, as manufactured by Adafruit Electronics. The in-circuit programmer enables the microcontroller U1 to be programmed in-circuit. The in-circuit programmer J1 is connected to pins 15, 16 and 17, MISO/MOSI and SCK, and an MCU reset on pin 29 on the microcontroller U1.

An optional interface cable H1 allows the in-circuit programmer JP1 to be programmed by an external personal computer (not shown). One end of the cable H1 plugs into the header and the other end plugs into a USB port (not shown) on the personal computer to enable in-circuit programming of the microcontroller U1. The MCU_RX and MCU_TX pins 30 and 31 of the microcontroller U1 are connected to pins 4 and 5 of the interface cable header H1. An MCU reset signal from the microcontroller U1 is connected to pin 6 of the interface cable header H1 by way of a capacitor H1. Once the microcontroller U1 is programmed, the interface cable H1 is removed.

Fire Safety Lights

FIG. 3C illustrates an exemplary number of fire safety lights 32. As shown in FIG. 3C, the fire safety lights 32 are shown as LEDs 2-9 and LEDs 15 and 16. Other lights may also be used. As shown, each of the LEDs are serially connected to a 240-ohm resistor to limit the current through the LEDs.

The serial combination of the LEDs and resistors may all be connected in parallel. The fire safety lights are controlled by way of a P-channel MOSFET transistor Q2 and a resistor R23. The source and drain terminals of the transistor Q2 are connected between a 3.3-volt DC supply and the connected fire safety lights. The anode terminals of the LEDs are connected to ground is connected to the gate of transistor Q2.

Mounting Arrangement

The fire safety lights, as well as the control circuitry, can be mounted on a printed circuit board (PCB) 24 (FIG. 5) which interconnects the fire safety lights and control circuitry. The use of the PCB allows the vertical footprint of the fire safety lights and control circuitry to be small to avoid without interference from the floor.

Figure 5:
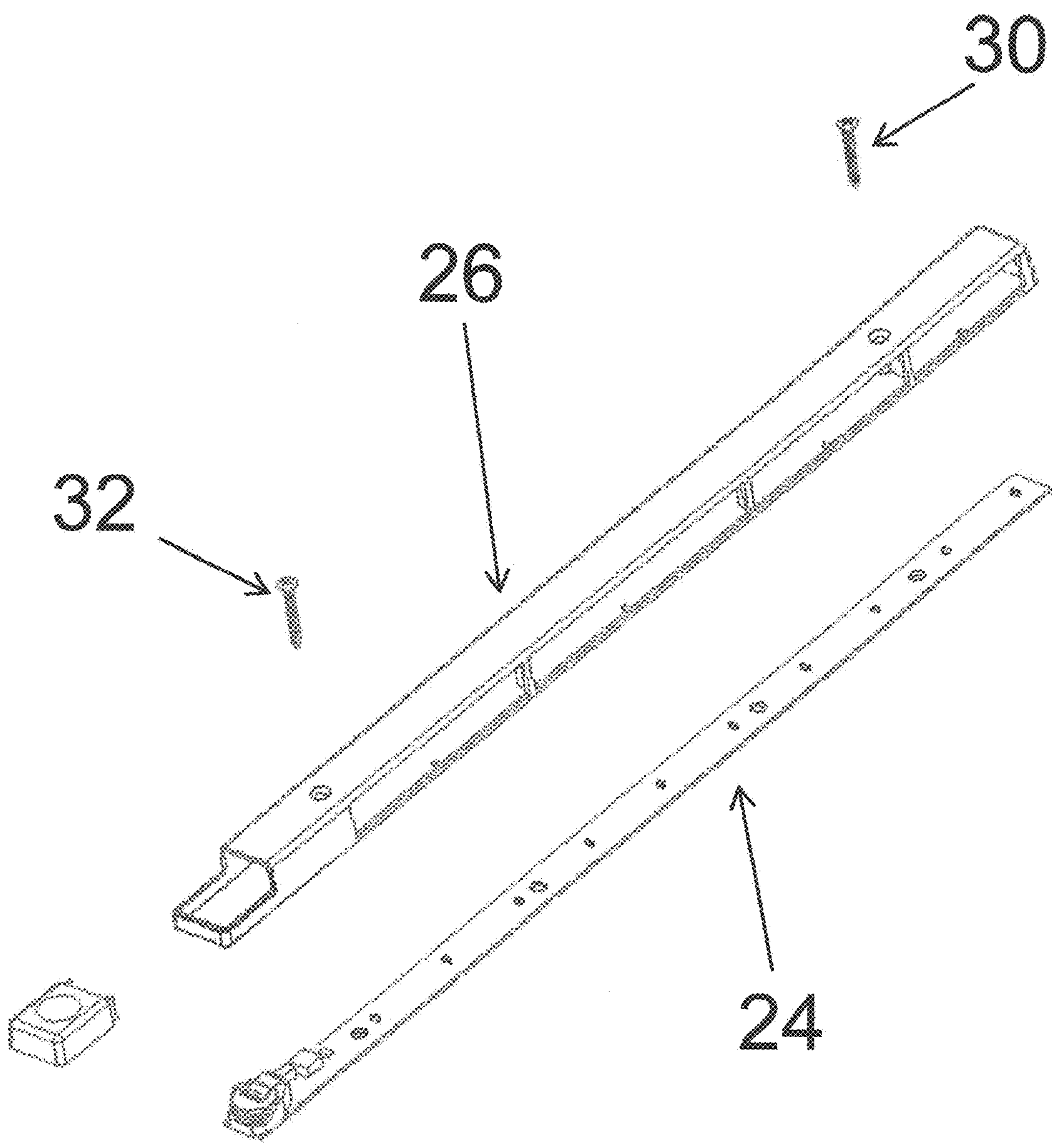
Figure 6:
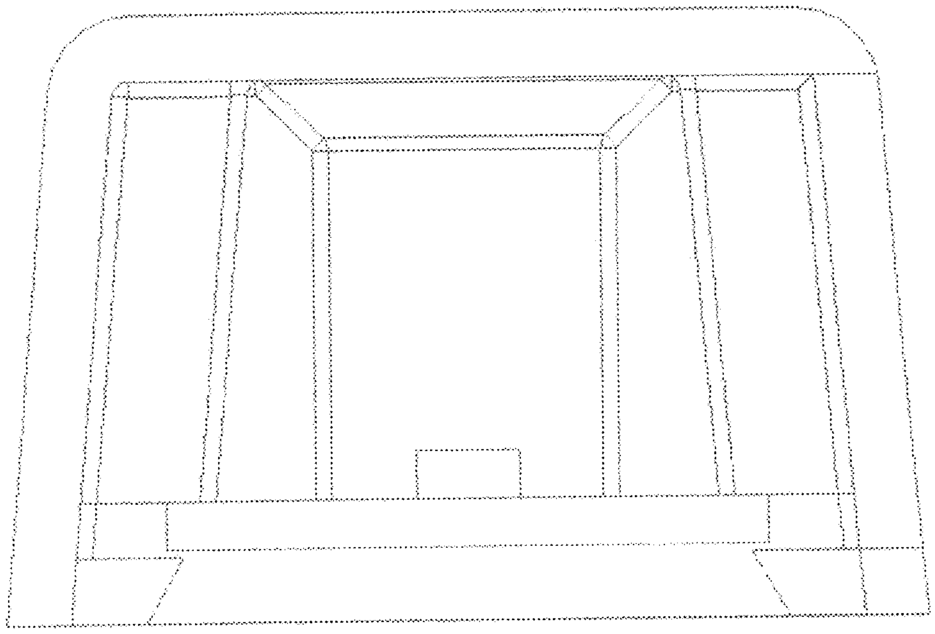
FIG. 6 is an exemplary embodiment of an end cap for closing the open end of the mounting structure.

The control circuitry and LEDS may be mounted by way of a PCB. As mentioned above, the PCB 24 is mounted in enclosure 26 (FIGS. 4-6). The PCB 24 is carried by an open-end enclosure 26, formed as an elongated rectangular box, open on one end to enable the PCB to slip in and out. The maximum dimensions of enclosure 26 are dictated by the width of the interior door and the length and width of the bottom rail, as well as the vertical distance between the bottom rail of the door and the floor. In instances when the vertical distance is insufficient to mount the enclosure with rubbing against the floor, the bottom of the door may need to be trimmed. As used herein, the bottom rail refers to the bottom edge of an interior door, whether the door is a solid wood door or a hollow core interior door.

Figure 7A:
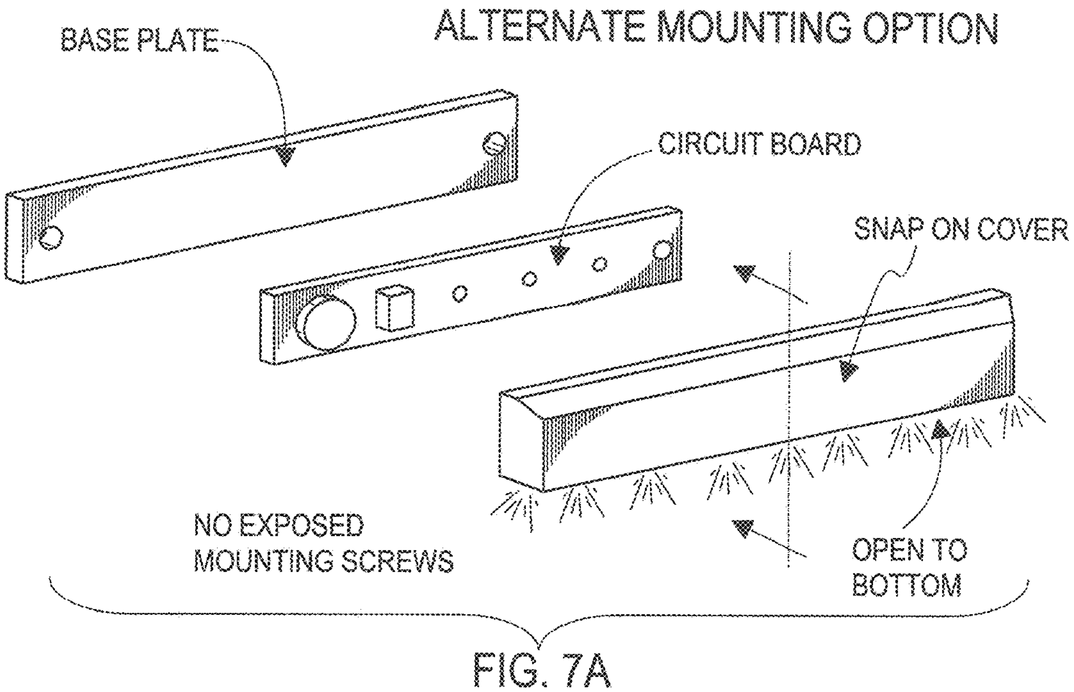
FIGS. 7A and 7B illustrate an alternative embodiment of a mounting structure for mounting the PCB near the bottom of an interior door.
Figure 7B:

Alternatively, fire safety lights and control circuitry may be mounted to a lower portion on a vertical panel of an interior door, as shown in FIG. 7B. An end cap 28 (FIGS. 5 and 6) is used to close the open end of the enclosure 26 after the PCB 24 has been inserted therein. The assembled enclosure may then be secured to the bottom rail of the door after the door is removed. The enclosure may include 2 through holes 30 and 32 and 2 screws 34 and 36 to enable the enclosure to be secured to the bottom rail of an interior door.

FIGS. 7*a* and 7*b* illustrate an alternative mounting structure for the PCB. Referring first to FIG. 7*b*, enclosure 38 is mounted near on a lower portion of a vertical panel of the door. In this embodiment, enclosure 38 can be secured to the door without removing it. Enclosure 38 includes a base plate 40, PCB board 42 and a snap on cover which is secured to the door 44. The base plate 40 includes a pair of through holes 46 and 48 for receiving screws (not shown) to secure the base plate 40 to the door. The PCB 42 can be secured to the base plate 40 with a suitable adhesive. Once the PCB 42 is in place, the snap on cover can be inserted over the assembly. The snap on cover 44 is open on the bottom to enable the LEDs to illuminate the exit path.

Obviously, many modifications and variations of the present invention are possible considering the above teachings. Thus, it is to be understood that within the scope of the appended claims, the invention may be practiced otherwise than as specifically described above.

I claim:

1. A fire light safety system comprising:

a smoke detector for generating a fire signal in response to a fire in an interior living space;

a first transceiver located adjacent said smoke detector, responsive to said fire signal from said smoke detector for transmitting said fire signal wirelessly to a control circuit adjacent said fire safety lights;

a control circuit responsive said fire signal for generating a trigger signal to control the illumination of said fire safety lights, wherein said control circuit includes a second transceiver for receiving said fire signal from said first transceiver and generating a trigger signal;

a plurality of fire safety lights responsive to said trigger signal; and an enclosure for carrying said plurality of fire safety lights and said control circuit, said enclosure open on one end adjacent said fire safety lights and mounted to a bottom rail of an interior door along an exit path of a building.

2. The fire safety system as recited in claim 1, wherein said enclosure is mounted to the bottom rail of an exterior portion of the interior door.

* * * * *